(12) United States Patent
Rachev et al.

(10) Patent No.: US 7,630,931 B1
(45) Date of Patent: Dec. 8, 2009

(54) SYSTEM AND METHOD FOR THE VALUATION OF DERIVATIVES

(75) Inventors: Svetlozar Todorov Rachev, Santa Barbara, CA (US); Christian Menn, Gundelfingen (DE)

(73) Assignee: Finanalytica, Inc., Seattle, WA (US)

( * ) Notice: Subject to any disclaimer, the term of this patent is extended or adjusted under 35 U.S.C. 154(b) by 202 days.

(21) Appl. No.: 11/378,675

(22) Filed: Mar. 17, 2006

Related U.S. Application Data

(60) Provisional application No. 60/663,220, filed on Mar. 17, 2005.

(51) Int. Cl.
*G06Q 40/00* (2006.01)
(52) U.S. Cl. .......................... 705/36 R; 705/35; 705/37
(58) Field of Classification Search ............. 705/35–45; 703/2
See application file for complete search history.

(56) References Cited

U.S. PATENT DOCUMENTS

| | | | | |
|---|---|---|---|---|
| 6,125,355 | A * | 9/2000 | Bekaert et al. ............ | 705/36 R |
| 6,640,204 | B2 * | 10/2003 | Feldman .................... | 702/189 |
| 6,643,631 | B1 * | 11/2003 | Heyde ........................ | 706/46 |
| 7,200,757 | B1 * | 4/2007 | Muralidhar et al. ......... | 713/189 |
| 7,236,953 | B1 * | 6/2007 | Cooper et al. ............. | 705/36 R |
| 2004/0044613 | A1 * | 3/2004 | Murakami et al. ........... | 705/37 |
| 2004/0172355 | A1 * | 9/2004 | Pandher ...................... | 705/37 |

OTHER PUBLICATIONS

Analysis of price dynamics in agricultural cash prices using fractal theory and implications for risk management with futures hedging. Hyun Joung, Jin. 2001. The Pennsylvania State University. ISBN: 0-493-31496-2, vol. 6207A of Dissertations Abstracts International.*
Generalized volatility model and calculating VaR using a new semiparametric model. Haiming, Guo. Dec. 5, 2005. University of Maryland, College Park, vol. 6612B of Dissertations Abstracts International.*
Financial Market Models with Levy Process and Time Varying Volatility, Young Shin Kim, S.T. Rachev, Michele Bianchi, Frank J Fabozzi. Journal of Banking and Finance: vol. and Issue 327. 2008. pp. 1363-1378.*
Black and Scholes, "The Pricing of Options and Corporate Liabilities," Jour. Of Political Economy (1973).
Merton, "The Theory of Rational Option Pricing," Bell Jour. of Economics and Management Sciences (1973).
Harrison and Kreps, "Martingales and Arbitrage in Multi-Period Securities Markets," Jour. of Economic Theory (1979).

(Continued)

*Primary Examiner*—Alexander Kalinowski
*Assistant Examiner*—Abhishek Vyas
(74) *Attorney, Agent, or Firm*—Patrick J. S. Inouye; Scott E. Smith

(57) ABSTRACT

A system and method for pricing of derivatives is presented. A volatility clustering time series process, including one or more predictive variables, is generated with an innovation process. Marginals of a probability distribution for the time series process follow a smoothly truncated heavy tailed and asymmetric probability distribution. Model parameters for the time series process are calibrated to a set of exogenously provided derivative prices. Pricing of derivatives, including options and swaps, is determined.

20 Claims, 3 Drawing Sheets

OTHER PUBLICATIONS

Harrison and Pliska, "Martingales and Stochastic Integrals in the Theory of Continuous Trading," Stochastic Processes and Their Applications (1980).

Heston, "A Closed Form Solution for Options with Stochastic Volatility with Applications to Bond and Currency Options," Review of Financial Studies (1993).

Hull and White, "The Pricing of Options on Assets with Stochastic Volatilities," Jour. of Finan. (1987).

Derman and Kani, "Riding on a Smile", Risk 7 (1994).

Dupire, "Pricing with a Smile," Risk 7 (1994).

Fama, "The Behaviour of Stock Market Prices," Jour. of Business (1965).

Mandelbrot, "New Methods in Statistical Economics," Jour. of Political Economy (1963).

Mandelbrot, "The Variation of Certain Speculative Prices," Jour. of Business (1963).

Engle, "Autoregressive Conditional Heteroscedasticity with Estimates of the Variance of United Kingdom Inflation," Econometrica (1982).

Bollerslev, "Generalized Autoregressive Conditional Heteroscedasticity," Jour. of Econometrics (1986).

Duan, "Augmented GARCH(p,q) Processes and its Diffusion Limit," Jour. of Econometrics (1997).

Menn and Rachev, "A New Class of Probability Distributions and its Application to Finance," Tech. Report at UCSB (2004).

Engle, "Dynamic Conditional Correlation—a Simple Class of Multivariate GARCH Models," Disscusion Paper at University of San Diego (2000).

Rachev and Mittnik, "Stable Paretian Models in Finance," Wiley (2000).

Scheffe, "The Analysis of Variance," p. 332, Wiley & Sons, Inc., New York (1959).

Grinold and Kahn, "Active Portfolio Management: a Quantitative Approach for Providing Superior Returns and Controlling the Risk," McGraw-Hill, NY (1999).

Campbell et al., "The Econometrics of Financial Markets," Princeton University Press, New Jersey (1997).

* cited by examiner

SYSTEM AND METHOD FOR THE VALUATION OF DERIVATIVES

CROSS-REFERENCE TO RELATED APPLICATION

This non-provisional patent application claims priority under 35 U.S.C. § 119(e) to U.S. provisional patent application Ser. No. 60/663,220, filed Mar. 17, 2005, the disclosure of which is incorporated by reference.

FIELD OF THE INVENTION

The system relates to automatic computing methods for the market consistent pricing of financial derivative instruments.

BACKGROUND OF THE INVENTION

Stock market crashes like those in October 1987 and October 1997, the turbulent period around the Asian Crisis in 1998 through 1999 or the burst of the "dotcom bubble" together with the extremely volatile period after Sep. 11, 2001 constantly remind financial engineers and risk managers how often extreme events actually happen in real-world financial markets. These observations have led to increased efforts to improve the flexibility and statistical reliability of existing models to capture the dynamics of economic variables.

The history of probabilistic modeling of economic variables and, especially, price processes, by means of stochastic processes goes back to Bachelier, who suggested Brownian Motion as a candidate to describe the evolution of stock markets. 70 years later, Black and Scholes, in "The Pricing of Options and Corporate Liabilities," *Jour. of Political Economy* (1973), and Merton, in "The Theory of Rational Option Pricing," *Bell Jour. of Economics and Management Sciences* (1973), the disclosures of which are incorporated by reference, used the Geometric Brownian Motion to describe the stock price movements in their famous solution of the option pricing problem. Their Nobel prize winning work inspired the foundation of the arbitrage pricing theory based on the martingale approach, which was described in the famous paper by Harrison and Kreps, in "Martingales and Arbitrage in Multi-Period Securities Markets," *Jour. of Economic Theory* (1979), and, subsequently, by Harrison and Pliska, in "Martingales and Stochastic Integrals in the Theory of Continuous Trading," *Stochastic Processes and Their Applications* (1981), the disclosures of which are incorporated by reference.

The key observation that pricing of derivatives has to be effected under a so-called risk-neutral or equivalent martingale measure (usually denoted as Q), which differs from the data generating "market measure" (usually denoted as P), has lead to increasing literature on what are called "implicit models." Examples for implicit models include stochastic volatility models (see, e.g., Heston, "A Closed Form Solution for Options with Stochastic Volatility with Applications to Bond and Currency Options," *Review of Financial Studies* (1993), or Hull and White, "The Pricing of Options on Assets with Stochastic Volatilities," *Jour. of Finan.* (1987), the disclosures of which are incorporated by reference), local volatility models (see, e.g., Derman and Kani, "Riding on a Smile," Risk 7 (1994), or Dupire, "Pricing with a Smile," Risk 7 (1994), the disclosures of which are incorporated by reference), and martingale models for the short rate and implied volatility models. The common characteristic inherent to implicit models is that the model parameters are determined through calibration on market prices of derivatives directly under the martingale measure and not through estimation from observations under the market measure. As a direct consequence, and at the same time, the main drawback of the calibration framework is that, the market prices cannot be explained, they are just fitted. The prices of liquid market instruments are used for the calibration procedure and, consequently, are reproduced more or less perfectly. However, for exotic derivatives, the prices derived from the implicit models differ substantially, since there is no market data on which to directly calibrate. Moreover, from an objective viewpoint, there is no way to determine which pricing model is the most reliable one given that the statistical fit to historical realizations of the underlying data is not taken into account.

An alternative approach to model price processes is pursued by econometricians. The goal of this approach is to provide the highest possible accuracy with respect to the empirical observations, or, in other words, to model the statistical characteristics of financial data. Thus, the focus of this approach lies in the statistical properties of historical realizations and the quality of forecasts. However, in using these models important aspects of derivative pricing are neglected.

Most econometric approaches neither present any risk neutral price processes nor are the markets defined in these models checked for the absence of arbitrage. Further, the econometric model approach assumes implicit or explicit knowledge of the statistical characteristics of financial data. Starting with the seminal work of Fama, "The Behaviour of Stock Market Prices," *Jour. of Business* (1965), and Mandelbrot, "New Methods in Statistical Economics," *Jour. of Political Economy* (1963) and "The Variation of Certain Speculative Prices," *Jour. of Business* (1963), the disclosures of which are incorporated by reference, and subsequently reported by various authors (see, e.g., Rachev and Mittnik, "Stable Paretian Models in Finance," Wiley (2000), the disclosure of which is incorporated by reference, for an extensive overview), researchers widely accept that financial return distributions are left-skewed and leptokurtic. A probability distribution is considered leptokurtic if the distribution exhibits kurtosis, where the mass of the distribution is greater in the tails and is less in the center or body, when compared to a Normal distribution. A number of quantitative measures of kurtosis have been developed, such as described in Scheffe, "The Analysis of Variance," p. 332, Wiley & Sons, Inc., New York (1959), the disclosure of which is incorporated by reference.

In addition, a probability distribution can be considered asymmetric if one side of the distribution is not a mirror image of the distribution, when the distribution is divided at the maximum value point or the mean. Additionally, in time-series or longitudinal sections of return distributions, one observes volatility clustering, that is, calm periods are followed by highly volatile periods or vice versa. Engle, "Autoregressive Conditional Heteroscedasticity with Estimates of the Variance of United Kingdom Inflation," Econometrica (1982) and Bollerslev, "Generalized Autoregressive Conditional Heteroscedasticity," *Jour. of Econometrics* (1986), the disclosures of which are incorporated by reference, introduced tractable time series models, denoted as ARCH and GARCH models, which gave rise to the explanation of the observed heteroscedasticity. In the subsequent years, various generalizations and variants of the original models have been published. The overview of Duan, "Augmented GARCH(p,q) Processes and its Diffusion Limit," *Jour. of Econometrics* (1997), the disclosure of which is incorporated by reference, introduced a general treatment of the different variants and examined their diffusion limits.

Although members of the ARCH/GARCH-class generate stochastic processes with heavy tailed marginals, the results of applying such processes to the option pricing problem are disappointing in various respects. In many cases, the predictive value of the model and the quality of the statistical fit are poor, leading to an inability to explain prices of liquid derivatives. The main reason for the poor performance of the statistical model can be ascribed to the underlying probability distribution of the innovation process. The underlying white noise process, which can be seen as the driving risk factor for the stochastic process are traditionally modeled as independent standard Normal random variables. Various authors (see, e.g., Rachev and Mittnik, supra, for an overview) have suggested replacing the Normal probability distribution by the Stable probability distribution. The class of Stable distributions forms an ideal alternative to the normal distributions, by combining the stability or self-similarity property, the ability to model the leptokurtic and skewed behavior of financial returns, and the mathematical modeling flexibility of the Normal distribution. The main drawback of stable non-Gaussian distributions is their infinite variance.

SUMMARY OF THE INVENTION

The drawbacks and limitations of the previous approaches to financial derivative pricing are overcome by the system and method presented in this paper. This system and method achieves maximum statistical reliability, statistical model accuracy, and predictive power to achieve market consistent derivative pricing. The system and method incorporates a unified framework, which provides the required behavior in two respects. First, scenarios for future market prices and value at risk are accurately predicted. Second, arbitrage-free prices of derivatives are produced, in the risk neutral world.

The system and method described employs a new class of probability distributions, known as smoothly truncated Stable distributions (STS-distributions), which combine the modeling flexibility of stable distributions with the existence of arbitrary moments. The STS-distributions are generated by replacing the heavy tails of the left hand tail of the Stable density function at some lower truncation level, and right hand tail of the Stable density function at some upper truncation level by the densities of two appropriately chosen normal distributions (one for the upper tail and one for the lower tail). Embodiments may use univariate or multivariate Stable distributions.

The system and method automatically determine in a first step a multivariate stochastic process describing the joint dynamics of different risk factors including, returns of individual securities, returns of appropriate market indices, various types of yield curves, exchange rates and interest rates. In a second step, the model parameters for the system may be calibrated to a set of exogenously provided derivative prices. In a third step, the system automatically determines prices of derivatives including options and swaps.

The stochastic process models employed by the system may be based on three main ingredients:
- A general multivariate time series process, such as the ARMA-GARCH family;
- An innovation process where the marginals of the probability distribution follow a smoothly truncated stable distribution (STS-distribution); and
- A copula approach to model the dependence structure between the risk factors.

The use of a multivariate time series model, such as the ARMA-GARCH family, allows for the explanation of key statistical features of returns including, autocorrelation and heteroscedasticity. The STS-distribution offers enough flexibility to describe the leptokurtic or heavy-tailed shape of empirical return distributions, while preserving the essential property of finite second moments of the probability distribution. The use of a copula approach combines modeling flexibility with computational tractability for complex dependency structures. All together the approach leads to a realistic and reliable model to describe the statistical properties of financial risk factors.

Some embodiments use a special subclass of time series processes models to achieve arbitrage-free pricing, and, thereby, enable the definition of a risk-neutral process for the underlying risk factors. This risk neutral process can be used to calibrate remaining parameters to pre-specified market prices and/or to determine arbitrage free derivative prices.

One embodiment provides a system and method for pricing of derivatives. A volatility clustering time series process, including one or more predictive variables, is generated with an innovation process. Marginals of a probability distribution for the time series process follow a smoothly truncated heavy tailed and asymmetric probability distribution. Model parameters for the time series process are calibrated to a set of exogenously provided derivative prices. Pricing of derivatives, including options and swaps, is determined.

It will be appreciated that the foregoing statements of the features of the invention are not intended as exhaustive or limiting, the proper scope thereof being appreciated by reference to this entire disclosure. For the sake of clarity, specific implementation details, such as numerical algorithms, are used in the foregoing discussion. It will be understood that a variety of implementations, including different numerical algorithms, can be employed without changing the scope or functionality of the system.

DETAILED DESCRIPTION

Figure 1:
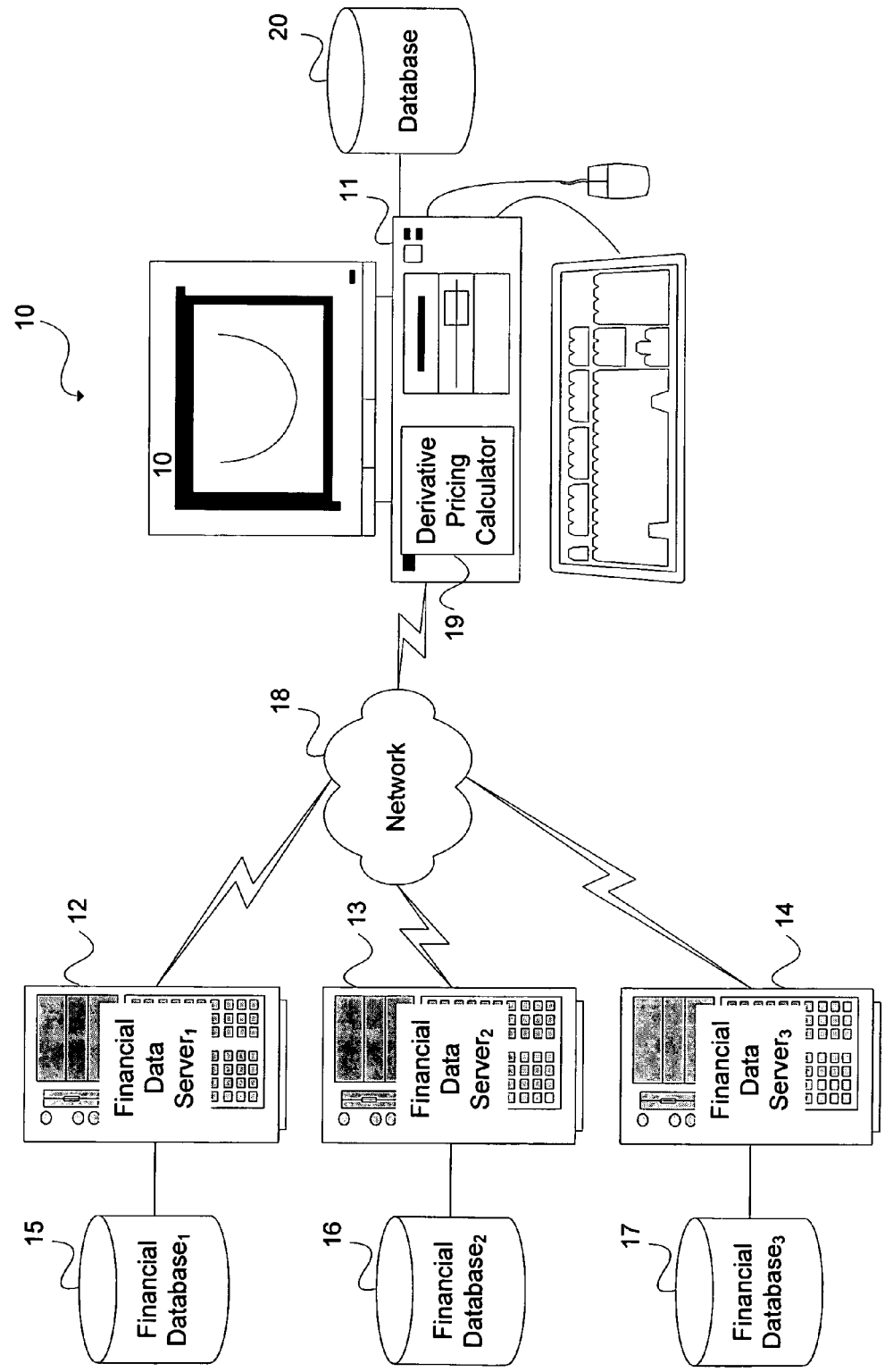
FIG. 1 is a schematic diagram showing a system for the valuation of derivatives in accordance with embodiments of the invention.

The system is equally applicable to one or more financial derivatives or any one or more portfolios containing one or more financial derivatives, where the derivatives are of one or more types or classes. The system can be implemented using any suitable type of automatic computing device with suitable volatile and nonvolatile storage and numerical computation capability. Control of the system can be manual, completely automated, including automatically changing the allocation of assets in the portfolio, or at any degree of automation desired. Some embodiments will state the computed results in terms of estimation results. Other embodiments will report results in terms of computed derivative prices or related characteristics, such as term structure of volatility smiles.

A derivative, also known as a contingent claim, is a financial contract whose values depends on the value of other, more basic underlying variables, called "underlyings." The underlyings can be individual securities, securities indexes or virtually any other variable including interest rates, credit defaults, foreign exchange rates, commodity prices, weather, crop yields, or virtually any other even or price or a function of these quantities. Futures, swaps and options are examples of derivatives. For example, a stock option is a derivative whose value is contingent on the (underlying) price of the stock. At the same time, the stock itself can be viewed as a contingent claim on the value of the firm issuing the stock. A "call" option gives the holder the right but not the obligation to buy, and a "put" option gives the holder the right but not the obligation to sell. The price in the contract is the "exercise" or "strike" price. The date in the contract is the "expiration date" or "maturity." A "real option" is a derivative whose "underlyings" are real world as opposed to financial assets. Real assets include land, plant, machinery, and so forth. Options can be embedded in investment projects; some examples are abandonment option, expansion option, contraction option, option to defer, option to extend. Other options are possible.

The system uses time series processes with STS-distributed innovations for the calculation of probability distributions of financial returns of risk factors. The risk factors can be the market price returns of individual financial assets or securities themselves or of a portfolio of financial assets. In other cases, risk factors can be derived as computed values, perhaps from fundamental securities information, or can be an exogenous factor, such as interest rates or macroeconomic factors, which may affect the price of a security. Those skilled in the art will be familiar with the large literature that addresses risk factors and risk factor models. For example, standard references can include Grinold and Kahn, "Active Portfolio Management: a Quantitative Approach for Providing Superior Returns and Controlling the Risk," McGraw-Hill, NY (1999) and Campbell et al., "The Econometrics of Financial Markets," Princeton University Press, New Jersey (1997), the disclosures of which are incorporated by reference. In the discussion herein, few, if any, restrictions are placed on the nature of the risk factors used by various embodiments. In the following discussion, the term return can refer to the relative change in any risk factor over some time horizon or time period.

System Overview

FIG. 1 is a functional block diagram 9 showing a system 10 for providing pricing of a financial derivative using a smoothly truncated stable distribution, in accordance with an embodiment of the invention. A workstation 11 is interoperatively interfaced to a plurality of servers 12-14 over a network 18, which can include an internetwork, such as the Internet, intranetwork, or combination of networking segments. In a further embodiment, the workstation 11 operates as a stand-alone determiner system without interfacing directly to other determiner systems, although data can still be exchanged indirectly through file transfer over removable media. Other network domain topologies, organizations and arrangements are possible.

The workstation 11 includes a Derivative Pricing Calculator 19 that determines prices for financial derivatives, as further described below beginning with reference to FIG. 2. The servers 12-14 each maintain a database 15-17 containing financial data, such as historical record of securities and risk factors for securities, that can optionally be retrieved by the workstation 11 during derivative pricing. The derivatives priced can be of one or more types as preciously described.

The individual derivative pricing or determiner systems, including the workstation 11 and servers 12-14, are general purpose, programmed digital determining devices consisting of a central processing unit (CPU), random access memory (RAM), non-volatile secondary storage, such as a hard drive or CD ROM drive, network interfaces, and can include peripheral devices, such as user interfacing means, such as a keyboard and display. Program code, including software programs, and data are loaded into the RAM for execution and processing by the CPU and results are generated for display, output, transmittal, or storage.

Figure 2:
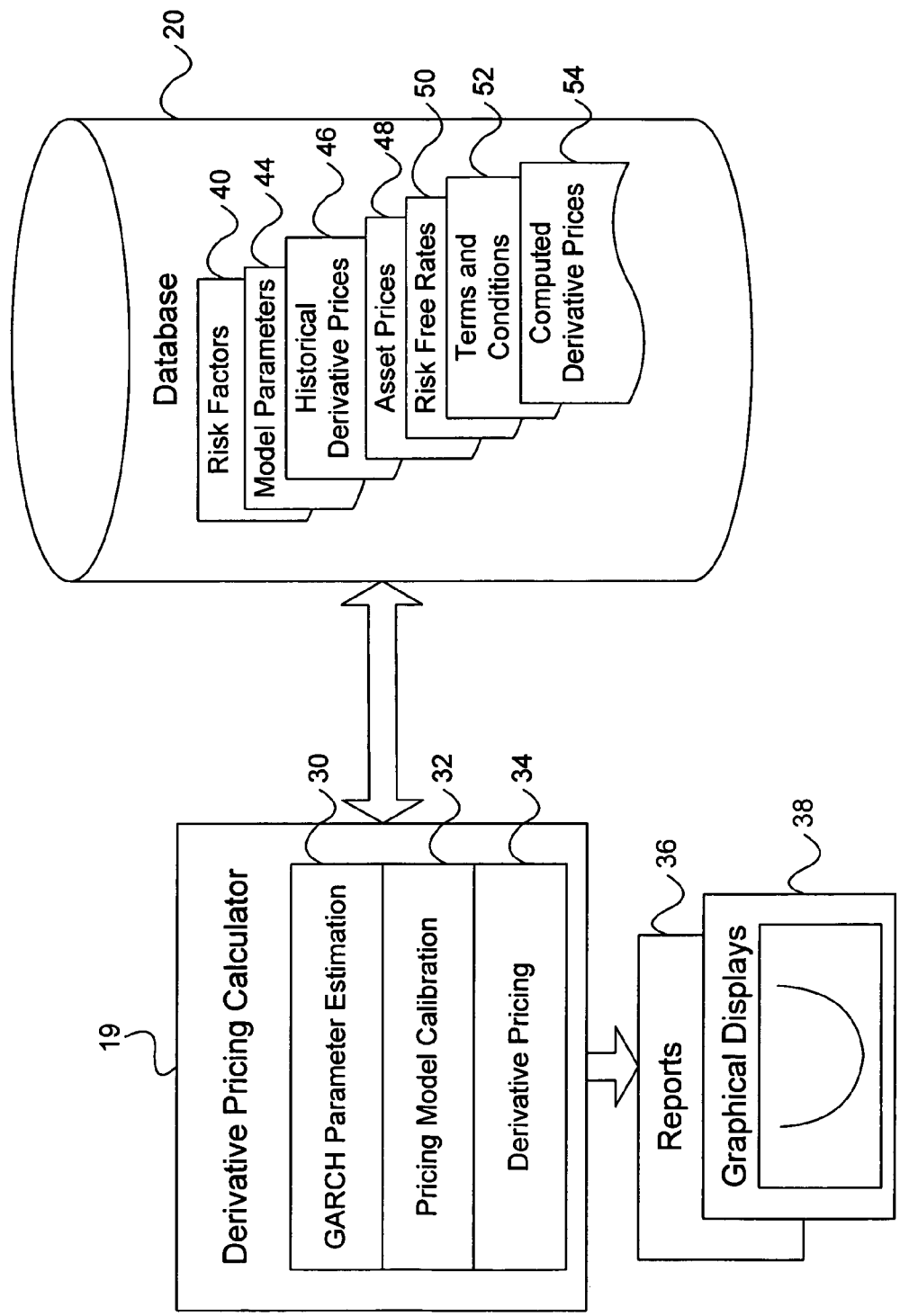
FIG. 2 is a schematic diagram of the derivative pricing calculator and database for use in the system of FIG. 1.

FIG. 2 is a block diagram 28 showing a derivative pricing calculator 19 for use in the system 10 of FIG. 1. The derivative pricing calculator 19 computes prices and possibly risk measures for one or more derivatives at one or more time horizons and one or more strike prices. In some embodiments, the derivative pricing calculator 19 comprises at least a GARCH parameter estimation 30 determining component to compute the parameters for the smoothly truncated Stable distribution based GARCH algorithm based on historical prices of underlying assets, a pricing model calibration 32 determining component using the GARCH model and historical data of liquid derivative prices for estimation of pricing algorithm parameters, and a derivative pricing 34 determining component using the results of the calibration steps to compute one or more prices for one or more non-liquid or exotic financial derivatives at one or more time horizons and strike prices.

In a further embodiment, the derivative pricing calculator 19 stores the computed derivative prices 54 in a database 20. These computed derivative prices 54 can be stored along with information used to interpolate prices from similar derivatives or at other time horizons in a rapid manner. The database 20 maintained by the derivative pricing calculator 19 can include data used by the GARCH parameter estimation 30 determining component and the pricing model calibration 32 determination component, and can include historical data for one or more risk factors 40, GARCH and pricing model parameters 44, historical derivative prices 46 for one or more liquid derivatives and for one or more time horizons, historical asset prices 48 for one or more underling assets, one or more risk free rates 50 of return for one or more time horizons, and terms and conditions 52 for one or more derivatives. The risk factors 40 can be market price returns of individual financial assets or securities or of a portfolio of financial assets. In other cases, the risk factors 40 can be derived as determined values, such as from fundamental securities information, or can be exogenous factors, such as interest rates or other macroeconomic factors, which may affect the price of a security. In the discussion herein, few, if any, restrictions are placed on the nature of the risk factors 40 used.

As outputs for use by a user or derivatives trader, the derivative pricing calculator 19 can generate graphical displays 38, for example, showing derivative prices for one or more time horizons and strike prices or for associated risks, and reports, such as a tabular report of computed derivative prices and risks 36. Other forms of output are possible.

STS-Distributions

The accurate modeling of financial returns and risk factors requires the use of probability distributions that account for leptokurtic and asymmetric behavior. Suitable probability distributions include the Sub-Gaussian Stable family, the t-distributions, mixtures of multivariate Normal distributions, and hyperbolic distributions.

A probability distribution is considered leptokurtic if it exhibits kurtosis, wherein the mass of the distribution is greater in the tails and less in the center or body when compared to a Normal distribution. A number of quantitative measures of kurtosis have been developed. For example, the standard text by Scheffé, "The Analysis of Variance," p. 332, Wiley, New York (1959), the disclosure of which is incorporated by reference, provides such definitions. A probability distribution of a random variable X can be considered symmetric if we have the relation $-(X-q_{0.5})^d = X-q_{0.5}$, which means that the distribution of the random variable minus its median equals that of the negative of the random variable minus the median. If this relation does not hold the true the distribution is denoted as asymmetric.

Whereas the statistical needs of modeling the distribution of financial risk factors imply the use of leptokurtic, heavy tailed and asymmetric distributions, standard economic theory (such as CAPM) as well as common market practice imply that the distribution of return innovations must possess finite moments of at least second order and for most applications even a finite moment generating function. As most of the above mentioned distributions do not fulfill this last requirement, a new class of probability distributions is applied, denoted as Smoothly truncated Stable distributions (STS distributions) as is discussed in C. Menn and S. T. Rachev, "A new class of probability distributions and its application to finance," Tech. Report at UCSB (2004), the disclosure of which is incorporated by reference.

The density of a "smoothly truncated stable distribution" is obtained by replacing the heavy tails of the probability density g(x) of some Stable distribution with parameters, denoted ($\alpha$, $\beta$, $\sigma$, $\mu$), by the thin tails of two appropriately chosen normal distributions, denoted $h_1$, $h_2$;

$$f(x) = \begin{cases} h_1(x), & x < a \\ g(x), & a \leq x \leq b \\ h_2(x), & x > b \end{cases} \quad (1.1)$$

where a denotes the lower truncation point and b denotes the upper truncation point.

In some embodiments, the probability density functions $h_1(x)$ and $h_2(x)$ can be the well-known Normal distribution. In these embodiments, the parameters ($v_i$, $\tau_i^2$), i=1,2 of the Normal distributions can be chosen such that the following two conditions are fulfilled:

1. The resulting function is the continuous density of a probability measure on the real line;
2. The probability mass on each half line represented by the Normal distributions equals the mass of the stable distribution, which is replaced.

The unique choice is given by the following two equations:

$$\tau_1^2 = \left(\frac{\varphi(\Phi^{-1}(G(a)))}{\sqrt{2\pi} g(a)}\right)^2, \; v_1 = a - \tau_1 \Phi^{-1}(G(a)) \quad (1.2)$$

and $$\tau_2^2 = \left(\frac{\varphi(\Phi^{-1}(G(b)))}{\sqrt{2\pi} g(b)}\right)^2, \; v_2 = b + \tau_2 \Phi^{-1}(1 - G(b)) \quad (1.3)$$

where $\phi$ denoted the density of the standard Normal distribution, $\Phi^{-1}$ the inverse of the cumulative distribution function of the standard Normal distribution and g (G) the density (cumulative distribution function) of the participating stable distribution.

The set of distributions, which can be obtained in this way, is denoted as set of STS-distributions. Due to the thin tails of the Normal densities, the STS-distributions admit finite moments of arbitrary order but nevertheless are able to explain extreme observations. Exhibit 1 provides a comparison of tail probabilities for an arbitrarily chosen STS-distribution with zero mean and unit variance and the standard Normal distribution. As one can see, the probability for extreme events is much higher under the STS-assumption.

Exhibit 1. Comparison of Tail Probabilities Center.

| | P(X ≤ x) with X ⊡ N(0,1) | P(X ≤ x) with X ⊡ STS |
|---|---|---|
| −10 | 7.6198530242 E−24 | 0.00009861132775 |
| −9 | 1.1285884060 E−19 | 0.00019210547239 |
| −8 | 6.2209605743 E−16 | 0.00036395064728 |
| −7 | 0.00000000000128 | 0.00067063777602 |
| −6 | 0.00000000098659 | 0.00120208371192 |
| −5 | 0.00000028665157 | 0.00209626995052 |
| −4 | 0.00003167124183 | 0.00355718712680 |
| −3 | 0.00134989803163 | 0.00669781592407 |
| −2 | 0.02275013194818 | 0.02013650454786 |
| −1 | 0.15865525393146 | 0.11793584416637 |

Those skilled in the art will understand that the concept of smooth tail truncation is not restricted to stable center and normal tail distributions but can be applied to different center distributions as well as with different tail distributions. Further, those skilled in the art will understand that the concept of smooth tail truncation can be applied to both univariate and multivariate probability distributions.

ARMAX-GARCH Processes

To describe the time evolution of the risk factors, we need a general time series model offering enough flexibility to capture the above-mentioned statistical properties such as clustering of the volatility. Therefore, we consider the following model, which is used to describe every marginal of the vector of risk factors to be described:

$$Y_t = c_0 + \sum_{k=1}^{d} c_k X_t^{(k)} + \sum_{i=1}^{n} a_i Y_{t-i} + f(\sigma_t) + \sum_{j=1}^{m} b_j \sigma_{t-j} \varepsilon_{t-j} + \sigma_t \varepsilon_t. \quad (1.4)$$

where $Y_t$ denotes the dependent variable, X a vector of exogenous variables. The process includes an autoregressive term of length n, a moving average term of length m. The measurable function $f$ embodies a generalized ARCH-in mean term, which allows for a non-linear influence of the volatility/variance in the conditional mean equation. In the present embodiment, the innovation process $(\epsilon_t)_{t \in I}$ is assumed to independent and identically distributed with zero mean and unit variance. Those skilled in the art will understand that it is possible to use alternative specifications with, e.g., fractional noise, to explain the effect of long range dependence in the residuals. The time dependent volatility is modeled with the help of a GARCH(p,q) process:

$$\sigma_t^2 = \alpha_0 + \sum_{k=1}^{q} \alpha_k \sigma_{t-k}^2 \varepsilon_{t-k}^2 + \sum_{k=1}^{p} \beta_k \sigma_{t-k}^2 \quad (1.5)$$

In this illustration, we have used the classical GARCH process introduced by Bollerslev and Taylor, but it is well understood that some embodiments could use different GARCH specifications such as E-GARCH, TS-GARCH or I-GARCH. Additionally, it is possible in this framework to use fractional GARCH-specification to explain long range dependence in the volatility.

Some embodiments will extend the univariate formulation to a multivariate setting in different ways. Some embodiments will model the multivariate dependency by means of a copula function, in which the marginal evolution of every risk factor is modeled according to equation (1.4) and (1.5), and the dependence structure is introduced by a copula function C which describes the joint distribution of the innovation ϵ. The defining equation is:

$$P(\epsilon_t^{(1)} \leq t_1, \epsilon_t^{(2)} \leq t_2, \ldots, \epsilon_t^{(N)} \leq t_N) = C(F_1(t_1), F_2(t_2), \ldots, F_n(t_N)) \quad (1.6)$$

where C denotes the copula function and $F_i^{-1}$, i=1, ..., N denotes the inverse of the distribution function of the i-th component of the N-dimensional innovation process. In other embodiments, the multivariate dependency will be generated by using a vector ARMAX-GARCH process of the following form (for simplicity only the ARCH(1)-process in the bivariate case is shown, but those skilled in the art will understand the simple extension of this formulation to higher dimensional cases):

$$\begin{bmatrix} \sigma_{11,t} \\ \sigma_{21,t} \\ \sigma_{22,t} \end{bmatrix} = \begin{bmatrix} \omega_{11} \\ \omega_{21} \\ \omega_{22} \end{bmatrix} + \begin{pmatrix} a_{11} & a_{12} & a_{13} \\ a_{21} & a_{22} & a_{23} \\ a_{31} & a_{32} & a_{33} \end{pmatrix} \begin{bmatrix} \varepsilon_{1,t-1}^2 \\ \varepsilon_{1,t-1}\varepsilon_{2,t-1} \\ \varepsilon_{2,t-1}^2 \end{bmatrix} \quad (1.7)$$

Yet, other embodiments will incorporate dynamic conditional correlation as proposed by Engle, "Dynamic Conditional Correlation—a Simple Class of Multivariate GARCH Models," Discussion Paper at University of San Diego (2000), the disclosure of which is incorporated herein by reference, to model the multivariate dependency.

Some embodiments will allow the choice of one or more multivariate dependency structures. Some embodiments will include facilities to test various possible dependency structures on historical data to determine the structure best suited for the data set. These test facilities may be fully automatic, or fully or partly under the control of a user or operator.

For the embodiments discussed above, the marginal distribution of the innovation process is described by a standardized STS-distribution. It will be understood by those skilled in the art that other standardized distributions for modeling the white noise process and as well possibly heavy-tailed distributions, if the requirement of finite moments of arbitrary order, can be neglected. Additionally, the foregoing discussion applies equally to other time series processes, such as the ARMA-GARCH and ARIMA-IGARCH families.

GARCH Parameter Estimation

The set of unknown parameters for each risk factor used in some embodiments consists of:

(a) d+1 parameters for the constant term and the exogenous variables;

(b) n autoregressive terms;

(c) m moving average terms, and;

(d) p+q+1 GARCH parameters.

These parameters form the set of model parameters that must be estimated. The set of distribution parameters depends on the chosen distribution. For embodiments using standardized STS-distributed innovations, there are four distribution parameters per model dimension. In some embodiments, these parameters are simultaneously estimated by means of a numerical conditional maximum likelihood procedure. In other embodiments, these parameters are estimated stepwise by a Gaussian conditional maximum-likelihood procedure for the model parameters and, in a second step, the distribution parameters are determined from the empirical residuals. Some other embodiments make use of iterative estimation procedure, where the model and distribution parameter estimation is iterated until some exit criterion is reached.

In some embodiments, the d-exogenous risk factors and their factor loadings in (1.4) can be determined (estimated) using factor analysis (time-series factor analysis, or cross-sectional factor analysis or statistical factor analysis) that the use of such factor models can lead to significant reduction of the number d of risk factors involved in the estimation of the model parameters.

In some embodiments the ARMAX-GARCH processes can be used as a model in factor analysis, where the d-exogenous variables explained the systematic risk component while autoregressive part in (1.4) together with (1.5) describes the idiosyncratic (non-systematic) risk. Such an approach is an extension of a time series factor analysis framework.

EXAMPLE

Modeling Stock/Index Prices

In this section, the univariate methods used to price a stock option, used in some embodiments, are presented as an example. Some embodiments will have the capabilities to price derivative products with other types of underlying or using the multivariate dependency methodologies discussed previously, and the extensions to these cases should be clearly understood by those skilled in the art.

The following model is especially defined to meet the needs of modeling stock price changes under the objective probability measure P in the univariate case:

$$\log S_t - \log S_{t-1} = r_t - d_t + \lambda \sigma_t - \log g(\sigma_t) + \sigma_t \epsilon_t \quad (1.8)$$

where $r_t$ denotes the risk free rate of return, $d_t$ the dividend rate, λ the market price of risk and g the moment generating function of the distribution of ϵ. As discussed earlier, the volatility is described by a GARCH(p,q) process:

$$\sigma_t^2 = \alpha_0 + \sum_{k=1}^{q} \alpha_k \sigma_{t-k}^2 \varepsilon_{t-k}^2 + \sum_{k=1}^{p} \beta_k \sigma_{t-k}^2$$

It will be known to those skilled in the art that from the theory of No-Arbitrage pricing, the valuation of derivatives must be effected under a probability measure (risk neutral measure/martingale measure) where the return on investment of all assets is equal to the risk free rate. The following equation presents a risk neutral dynamic of the time series model (1.4):

$$\log S_t - \log S_{t-1} = r_t - d_t - \log g(\sigma_t) + \sigma_t \epsilon_t \quad (1.9)$$

Under this formulation, the variance process changes according to:

$$\sigma_t^2 = \alpha_0 + \sum_{k=1}^{q} \alpha_k \sigma_{t-k}^2 (\varepsilon_{t-k} - \lambda)^2 + \sum_{k=1}^{p} \beta_k \sigma_{t-k}^2 \quad (1.10)$$

The changes of measure from the objective probability measure P to the risk neutral probability measure Q is effected by using the location-scale invariance of the family of STS-distributions. This invariance implies that it is possible to define the risk neutral measure Q such that the distribution of $\epsilon_t$ under Q equals that of $\epsilon_t - \lambda$, under P. Having defined a risk neutral process, the arbitrage free prices of derivatives can be determined. Consider, for example, a European call option on S with strike K and maturity T whose price at time t is denoted by $C_t$. The arbitrage free model price is given following Menn-Rachev option pricing formula:

$$C_t = E_Q\left(e^{-\Sigma_{k=t+1}^T r_k} \cdot (S_T - K)_+ \mid \Im_t\right) \quad (1.11)$$

The main advantage of the STS-GARCH framework and the Menn-Rachev-option pricing formula is the ability to produce satisfactory result in both worlds: The statistical fit to historical realization is better than in concurring models and, on the other hand, the implied volatility surface can be calibrated to the market counterpart of liquid instruments.

Those skilled in the art will recognize that the concepts described in this example can be applied to other underlyings and derivatives such as exchange rates or interest rates and swaps or futures. Those skilled in the art will also recognize that the multivariate means described in section 2.3 can be applied as well.

Implementation and Calibration

Figure 3:
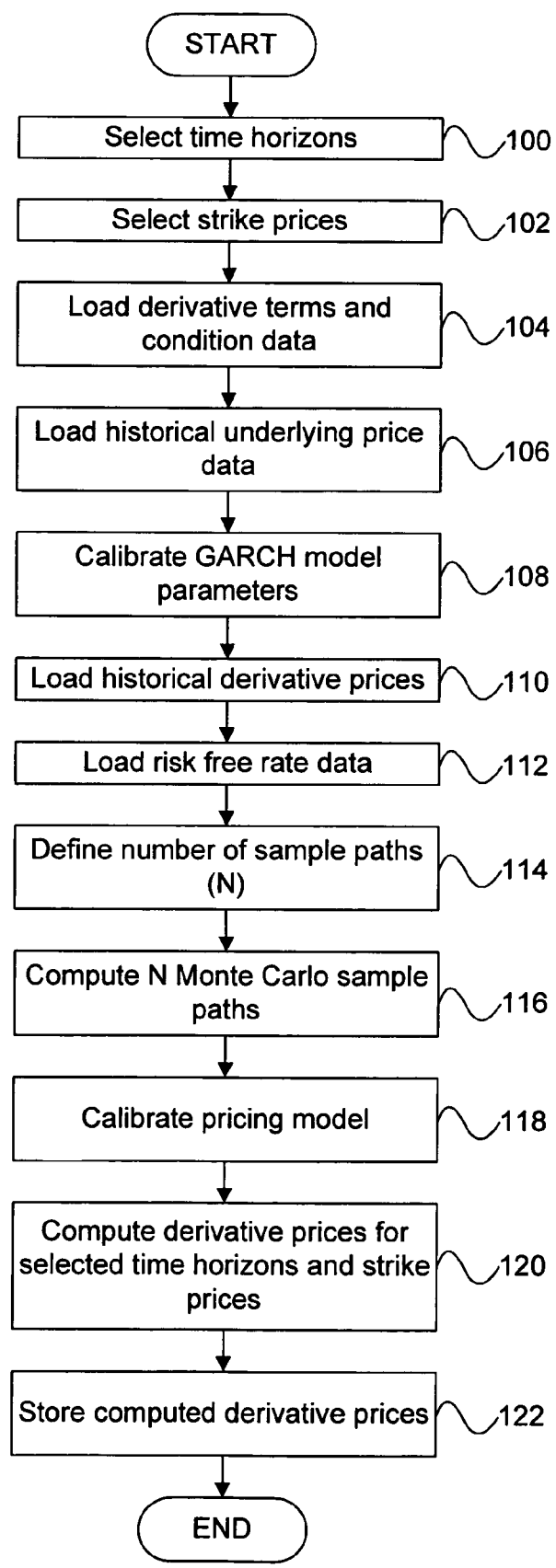
FIG. 3 is a flow chart showing a method for the valuation of derivatives in accordance with embodiments of the invention.

The process used by some embodiments of the system to compute the prices of financial derivatives using a derivative pricing calculator 19 and a database 20 is shown in FIG. 3.

In step 100, one or more time horizons for the derivative pricing calculations are selected. In step 102, one or more strike prices for the derivative pricing calculations are selected.

In step 104, the terms and conditions, including information on underlying assets, and special properties of the options, are loaded for the one or more derivatives to be priced. In step 106, the historical price data for the one or more underlying assets are loaded.

In step 108, the model and distribution parameters of the STS-GARCH-process are estimated or calibrated using the historical underlying asset prices using one of the procedures previously described.

In step 110, the historical prices of derivatives are loaded. In step 112, the risk free rate data is loaded.

In step 114, the number of sample paths are defined or selected. In step 116, the Monte Carlo sample paths are computed. In step 118, model prices for the financial derivatives are calibrated using historical prices of liquid derivatives, using the expectation evaluated by the Monte Carlo simulation. Through an adequate variation of the free model parameters, such as the market price of risk, the initial volatility or the risk free rate of return, the model prices are calibrated to the market prices.

In step 120, prices for other non-liquid (exotic) derivatives on the same underlying are computed using the model parameters computed in steps 108 and 118. In some embodiments, the computed prices can be stored as in step 122.

Once prices are computed for one or more selected derivatives, for one or more time horizons, and one or more strike prices, prices for other derivatives, other time horizons, and other strike prices can be computed in a rapid manner using interpolation techniques that will be well know to those skilled in the art.

Those skilled in the art will recognize that the described concept can be implemented in various different computer languages. Additionally, the exact type of estimation can vary (cf. section 2.4) and the calibration method could be affected in a different way or even be neglected.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for determining prices of derivatives, comprising:

a memory comprising a database configured to store historical prices of underlying assets and historical prices of derivatives of the underlying assets;

a processor configured to execute computer executable code stored in program modules, comprising:

a stochastic process modeling module, comprising:

a time series module configured to generate a time series process describing risk factors comprising returns for the underlying assets;

a smooth truncation module configured to generate a smoothly truncated heavy tailed asymmetric probability distribution and by replacing the left and right heavy tails of a Stable distribution based on the time series process by a first and second normal distribution, respectively, in accordance with the equation:

$$\tau_1^2 = \left(\frac{\varphi(\Phi^{-1}(G(a)))}{\sqrt{2\pi}\, g(a)}\right)^2, \, v_1 = a - \tau_1 \Phi^{-1}(G(a))$$

and $$\tau_2^2 = \left(\frac{\varphi(\Phi^{-1}(G(b)))}{\sqrt{2\pi}\, g(b)}\right)^2, \, v_2 = b + \tau_2 \Phi^{-1}(1 - G(b))$$

where $v$ and $\tau^2$ comprise parameters $(v_i, \tau_i^2)$, i=1,2 of the normal distributions, $v$ further comprises mean of the normal distribution, $\tau^2$ further comprises variance of the normal distribution, $\phi$ comprises the density of the normal distribution, $\Phi^{-1}$ comprises the inverse of the cumulative distribution function of the normal distribution, g comprises the density of the Stable distribution, G comprises the cumulative distribution function of the Stable distribution, a comprises the lower truncation point and b comprises the upper truncation point of the Stable distribution by the first and second normal distribution; and an innovation module configured to determine an innovation process, wherein marginals of the probability distribution of the innovation process comprise the smoothly truncated heavy tailed and asymmetric probability distribution;

a calibrator module configured to set parameters for the innovation process to match the historical prices, in accordance with the equation:

log $S_t$–log $S_{t-1}$=$r_t$–$d_t$–log $g(\sigma_t)$+$\sigma_t \epsilon_t$, wherein conditional variance of volatility of the underlying asset changes over time in accordance with the equation:

$$\sigma_t^2 = \alpha_0 + \sum_{k=1}^{q} \alpha_k \sigma_{t-k}^2 (\varepsilon_{t-k} - \lambda)^2 + \sum_{k=1}^{p} \beta_k \sigma_{t-k}^2$$

where $S_t$ comprises the price of the underlying asset at time t, $r_t$ comprises risk free rate of return, $d_t$ comprises dividend rate at time t of the underlying asset, log g comprises the logarithmic moment generating function of the smooth truncated heavy tailed asymmetric probability distribution, $\sigma_t$ comprises volatility of the underlying asset, $\sigma_t^2$ comprises conditional variance of the underlying asset, $\alpha_k$ comprises coefficients of the lag-squared innovations, $\epsilon_t$ comprises the innovation process, $\lambda$ comprises market price of risk, t comprises discrete time, k comprises an index parameter where k is an integer from one 1 to q in the first summation and 1 to p in the second summation, p comprises the number of lags of the conditional variance terms, q comprises the number of terms of the lag-squared innovations, and $\beta_k$ comprises the coefficients of the lagged conditional variances;

a derivative pricing calculator module configured to determine future prices of derivatives comprising options and swaps by executing the innovation process on the parameters;

an output device configured to provide future prices of the derivatives, and a network to operatively couple and provide communication between the database, the output device, and the computer processor.

2. A system according to claim 1, wherein the risk factors are selected from the group comprising returns of individual securities, returns of appropriate market indices, a plurality of yield curves, a plurality of exchange rates, and a plurality of interest rates.

3. A system according to claim 1, wherein the probability distribution is selected from the group comprising a smoothly truncated stable distribution, a multivariate smoothly truncated stable distribution, a smoothly truncated t-distribution, and a smoothly truncated hyperbolic distribution for each risk factor.

4. A system according to claim 1, further comprising:
a modeler module configured to model the time series process using a multivariate smoothly truncated stable distribution.

5. A system according to claim 1, wherein the time series process is based on an ARMAX-GARCH model.

6. A system according to claim 1, wherein the time series process incorporates dependencies between a plurality of the risk factors.

7. A system according to claim 6, further comprising:
a modeler module configured to model a dependency structure between the plurality of risk factors by a copula structure.

8. A system according to claim 1, wherein the pricing of the derivatives comprises arbitrage-free pricing of derivatives.

9. A system according to claim 1, wherein future market prices of the derivatives are determined at one or more time horizons.

10. A system according to claim 9, wherein the database is further configured to store scenarios of the future market prices and the processor comprises a risk module configured to determine one or more of the risk factors based on the scenarios.

11. A computer-implemented method for determining prices of derivatives, the computer-implemented method comprising:
storing historical prices of underlying assets and historical prices of derivatives of the underlying assets in a database;
modeling a stochastic process by a computer, comprising:
generating a time series process describing risk factors comprising price returns for the underlying assets;
generating a smoothly truncated heavy tailed asymmetric probability distribution and replacing the left and right heavy tails of a Stable distribution based on the time series process by a first and second normal distribution, respectively, in accordance with the equation:

$$\tau_1^2 = \left(\frac{\varphi(\Phi^{-1}(G(a)))}{\sqrt{2\pi}\, g(a)}\right)^2, \; v_1 = a - \tau_1 \Phi^{-1}(G(a))$$

and $$\tau_2^2 = \left(\frac{\varphi(\Phi^{-1}(G(b)))}{\sqrt{2\pi}\, g(b)}\right)^2, \; v_2 = b + \tau_2 \Phi^{-1}(1 - G(b))$$

where v and $\tau^2$ comprise parameters $(v_i, \tau_i^2)$, i=1,2 of the normal distributions, v further comprises mean of the normal distribution, $\tau^2$ further comprises variance of the normal distribution, $\phi$ comprises the density of the normal distribution, $\Phi^{-1}$ comprises the inverse of the cumulative distribution function of the normal distribution, g comprises the density of the Stable distribution, G comprises the cumulative distribution function of the Stable distribution, a comprises the lower truncation point and b comprises the upper truncation point of the Stable distribution by the first and second normal distribution; and determining an innovation process, wherein marginals of the probability distribution of the innovation process comprise the smoothly truncated heavy tailed and asymmetric probability distribution;

setting parameters for the innovation process to match the historical prices, in accordance with the equation:

log $S_t$ – log $S_{t-1} = r_t - d_t$ log $g(\sigma_t) + \sigma_t \epsilon_t$, wherein conditional variance of volatility of the underlying asset changes over time in accordance with the equation:

$$\sigma_t^2 = \alpha_0 + \sum_{k=1}^{q} \alpha_k \sigma_{t-k}^2 (\epsilon_{t-k} - \lambda)^2 + \sum_{k=1}^{p} \beta_k \sigma_{t-k}^2$$

where $S_t$ comprises the price of the underlying asset at time t, $r_t$ comprises risk free rate of return, $d_t$ comprises dividend rate at time t of the underlying asset, log g comprises the logarithmic moment generating function of the smooth truncated heavy tailed asymmetric probability distribution, $Q_t$ comprises volatility of the underlying asset, $\sigma_t^2$ comprises conditional variance of the underlying asset, $\alpha_k$ comprises coefficients of the lag-squared innovations, $\epsilon_t$ comprises the innovation process, $\lambda$ comprises market price of risk, t comprises discrete time, k comprises an index parameter where k is an integer from one 1 to q in the first summation and 1 to p in the second summation, p comprises the number of lags of the conditional variance terms, q comprises the number of terms of the lag-squared innovations, and $\beta_k$ comprises the coefficients of the lagged conditional variances;

determining future prices of the derivatives comprising options and swaps by executing the innovation process on the parameters; and providing the prices of the derivatives via an output device.

12. A method according to claim 11, further comprising:
selecting the risk factors from the group comprising returns of individual securities, returns of appropriate market indices, a plurality of yield curves, a plurality of exchange rates, and a plurality of interest rates.

13. A method according to claim 11, further comprising:
selecting the probability distribution from the group comprising a smoothly truncated stable distribution, a multivariate smoothly truncated stable distribution, a smoothly truncated t-distribution, and a smoothly truncated hyperbolic distribution for each risk factor.

14. A method according to claim 11, further comprising:
modeling the time series process using a multivariate smoothly truncated stable distribution.

15. A method according to claim 11, wherein the time series process is based on an ARMAX-GARCH model.

16. A method according to claim 11, wherein the time series process incorporates dependencies between a plurality of the risk factors.

17. A method according to claim 16, further comprising:
modeling a dependency structure between the plurality of risk factors by a copula structure.

18. A method according to claim 11, wherein the pricing of the derivatives comprises arbitrage-free pricing of derivatives.

19. A method according to claim 11, further comprising:
computing future market prices of the derivatives at one or more time horizons.

20. A method according to claim 19, further comprising:
storing scenarios of the future market prices in the database; and
determining one or more of the risk factors based on the scenarios.

* * * * *